8551X

H. Mellish

Turning Irregular Forms.

Patented Dec. 23, 1834.

AM. PHOTO-LITHO. CO. N.Y. (OSBORNE'S PROCESS)

Henry Mellish of Walpole New Hampshire
Letters Patent

The Schedule referred to in these Letters Patent and making part of the same containing a description in the words of the said Henry Mellish him self of his improvement being a machine for turning Lasts, Boot trees, spokes and other articles that may be turned by a pattern.

To all to Whom these presents shall come: Be it Known that I Henry Mellish of Walpole, in the County of Cheshire and State of New Hamp-shire have invented a new and useful improvement in the useful arts being a machine for turning Lasts, Boot trees, spokes and other articles that may be turned by a pattern called Mellishes pattern guiding turning Lathe, and that the following is a full and exact descrip-tion of the construction and operation of the same as invented or improved by me reference being had to the annexed drawings.

Figure 2:
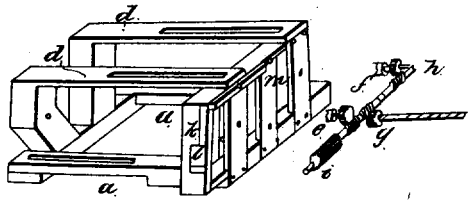
Figure 4:
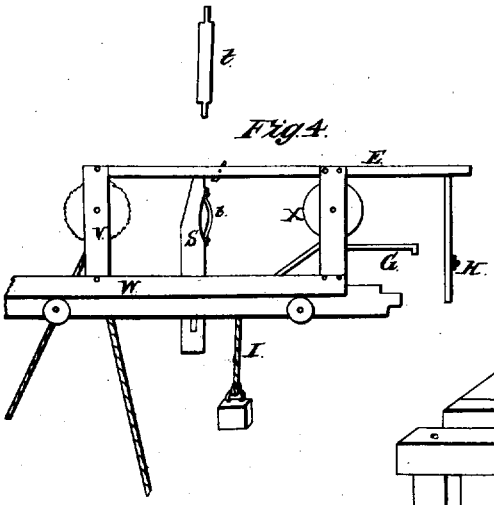
Figure 1:
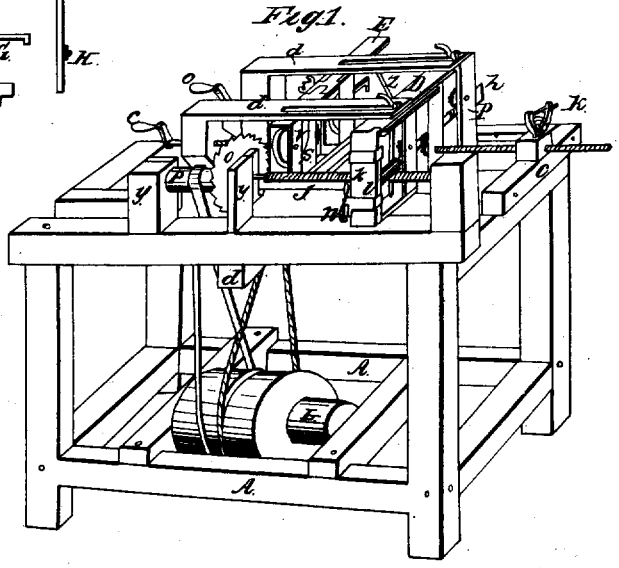
Figure 3:
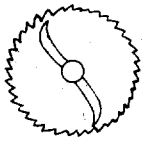

Fig I, is a perspective view of the machine. A B. The frame is construc-ted by mortising and tenoning together four posts, eight rails and two cross rails to support the main cylinder, and the rail a to support the guage post and finisher. The whole being made of timber three inches and a half square and forming a frame three feet + three inches long, and three feet and two inches wide, and two feet and seven inches high, the rail B being its whole thickness above the rest of the frame. C. is a carriage running on tracks in the top end rails of the frame, and is three feet seven inches long by two feet seven inches wide – The inside upper corners of the long rails of this carriage are halved away so as to form a ledge for the carriage D to slide on. D is a carriage containing the centres and dogs, and gears to hold and turn the pattern and timber to be worked. The width of this carriage is such as to fit into the car-riage C in which it slides the length one foot nine inches and one half and the height one foot two inches. The sills are made of tim-ber three inches square being framed together and made fast at the end D with bolts. the side sills having one half their thickness cut away at the under sides to within six inches of the cross sill at the end D (See 22 Fig 2) when they are represented with long open-ings, through which bolts are passed to make them fast to the sill B. Into this sill are framed two head blocks, to receive the centres or crank C. at a distance of one foot four inches apart. d.d. are two pieces of board dovetailed into the tops of the head blocks in the sill B. and reaching to the opposite end of the carriage where they are made fast with bolts passing up through the cap piece D. and the long narrow open-ings in them. This cap piece is supported by six standards dovetailed into the sill below and the cap piece: three on either side opposite to each other they being three inches wide and one inch thick. the two outside pairs standing at such distance apart, as to receive the arbours and gears, e f. with dogs at the ends at a distance of one foot and four inches apart and the other pair midway between them where the gear and feeding screw g. is placed: these gears being two inches in diameter, and each having thirteen cogs or teeth. h is a shaft of iron with endless screws attached to it to work into the gears above described. e f. turning above and g. below the shaft which is supported at each end by pieces running across and connecting the standards e. and f. to their mates i is a pinion of iron five inches long and two in diameter the arbour of which is attached to the shaft h. by drilling a hole in the end of the shaft and inserting an oval head on the end of the pinion arbour and passing a pin through both: the pin hole in the shaft should be oblong. so as to let the pin and head play in the end of the shaft. This pinion is placed under and works into the long endless screw J. which is attach-ed to the end of the saw arbour in the same manner as the shaft and arbour above described. K is a perpendicular piece one inch thick, at-tached to the cap piece D of the carriage at the apex end, the cap piece extending eleven inches from the standard e. and attached at the other end to another piece one inch thick made fast to the sill and extend-ing a like distance from the standard l is a moveable piece support-ing the pinion which may be raised so as to bring the pinion into gear with the screw by depressing the end of the lever on which it is kept by operation of a spiral spring at the lower end of the lever m. and 8551X Dec 23, 1834 the pin at the top of it which is thrown into the moveable piece as it
is raised. O is a twelve inch circular saw with two hooks or cutters
one eight of an inch thick attached to it. they being three fourths of an
inch wide and reaching from the arbour to within one fourth of an inch
of the edges of the saw, each having a spur at the edge and made fast
to the saw, by passing screws through it into them, (see Fig III) P
the pully on the saw arbour. the arbour and saw are supported by the
three head blocks Y. the centre one being one inch thick, the others
three. S is a post framed into the cross rail a. and supports a vi-
brating guage t made of steel and bent to a curve to correspond with the
circle of the saw. and turning on bearings at the ends (see S.t Fig IV.)
E the finisher reference being had to the annext drawing Fig IV (a
sectional view) u is a circular plate or file seven inches in diameter
and half an inch thick, rounded ~~[illegible]~~ at the periphery to the curve
of a quarter of a circle, and turns on a bour in the standard V and
a corresponding one oposite to it which are made fast to the sills W. with
bolts. the sills two feet long, two and a half inches wide, and one
inch thick and standing three and a half inches apart. being connect
ed at the end W. by a piece one inch thick and four wide X is a
guage wheel of mettal of the same demensions of the circular file above
described, but smooth at the periferey, and supported in the same man
ner except the standards are soled at the bottom and the sills made fast
with bolts passing through from side to side the centre of the file and guage
wheel standing one foot four inches apart E is a cap piece with a
groove in the underside into which a tenon at the top of the guage
standard is fited also a tenon at the top of the piece Z. this piece
being made fast to the back rail of the carriage C. G is a hook attached
to the finisher which when drawn back passes thro the piece Z. where it
may be made fast by turning the button H on the back side of it. the
sills of the finisher running tracks on each side of the rail a. I is a
cord attached to the finisher passing over a pulley in the rail a and a
weight attached to it to keep the guage wheel against the pattern. K is
a clasp with a joint at the lower end and a spring catch at the top.

8551X Dec 05, 1834 with a hole and thread between the two parts to recieve the feeding screw
q. this clasp being inserted in the head block C. To keep the carriage
bearing so as to keep the pattern in contact with the guage t a spyral
spring is attached at one end to the back rail of the carriage C. The
other end to the rail B. The operation is as follows. any of the power
usually made use of to propel machinery is applied by a belt on the
pulley L. and a belt from the main cylinder over the pulley P. and a
round band over a pulley on the file arbour which puts the saw and
finisher in motion. The timber to be turned should be suspended by the
ends between the dog on the arbour, c. and the centre c. and between
the saw and file. The pattern in the same manner by the other dog
and centre between the two guages. then by liberating the carriage C
from the back rail of the frame by turning a button the spyral spring
will move it toward saw, and the pattern against the guage t. the car
riage D being previously moved to the end c of the other carriage and
the clasp K shut on to the feeding screw then by depressing the end of
the lever m. the pinion i will be geared into the screw J and give
motion to timber pattern and carriages after the saw and hooks have cut a suf
ficient number of times round the timber the button H should be
turned and the finisher let up to timber, when the carriage D has
passed to the oposite end of the carriage C. the lower end of the leaver
n will come in contact with a pin across the lower end of the head
block y. and the pinion i. will drop, when the motion of the carria
ges will stop so that they may be drawn back and the work taken
out. The Invention here claimed and for which a patent is
desired to be secured is. first the combined application of the saw
and hooks. and screw attached to their arbour. 2d The application
of gears to the arbours to which the dogs are attached for the purpose
of turning the timber and pattern. 3d the application of the circular
file for finishing. The above described combination being necessary to
effect the required operation. The size and proportions of the whole may
be varied to suit the views and purposes of the constructor

[illegible] Witnesses { David Fisher
Joseph Fisher

Henry Mellish

[illegible]

(1820 words)